United States Patent
Choi et al.

(10) Patent No.: US 12,188,173 B2
(45) Date of Patent: Jan. 7, 2025

(54) CLOTHING PROCESSING APPARATUS

(71) Applicant: LG Electronics Inc., Seoul (KR)

(72) Inventors: Junyoung Choi, Seoul (KR); Wansik Nam, Seoul (KR); Sunghoo Park, Seoul (KR); Hyeyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 17/270,783

(22) PCT Filed: Aug. 23, 2019

(86) PCT No.: PCT/KR2019/010754
§ 371 (c)(1),
(2) Date: Feb. 23, 2021

(87) PCT Pub. No.: WO2020/045902
PCT Pub. Date: Mar. 5, 2020

(65) Prior Publication Data
US 2021/0340704 A1 Nov. 4, 2021

Related U.S. Application Data (60) Provisional application No. 62/722,990, filed on Aug. 27, 2018.

(51) Int. Cl.
*D06F 73/02* (2006.01)
*D06F 73/00* (2006.01)
*G10L 15/22* (2006.01)

(52) U.S. Cl.
CPC .............. *D06F 73/02* (2013.01); *D06F 73/00* (2013.01); *G10L 15/22* (2013.01); *G10L 2015/223* (2013.01)

(58) Field of Classification Search
CPC ................................. D06F 73/00; D06F 73/02
See application file for complete search history.

(56) References Cited

U.S. PATENT DOCUMENTS 9,453,299 B2 * 9/2016 Park .......................... G10L 15/26
2009/0235464 A1 * 9/2009 Cassidy .................. D06F 17/04
68/28

(Continued)

FOREIGN PATENT DOCUMENTS

EP 2031121 3/2009
EP 3034680 6/2016

(Continued)

OTHER PUBLICATIONS

PCT International Search Report and Written Opinion in International Appln. No. PCT/KR2019/010754, dated Jan. 14, 2021, 8 pages (English translation only).

(Continued)

*Primary Examiner* — Joseph L. Perrin
(74) *Attorney, Agent, or Firm* — Fish & Richardson P.C.

(57) ABSTRACT

The present invention relates to a clothing processing apparatus comprising: a cabinet provided with an inlet; a first chamber provided inside the cabinet to provide a space in which clothes are accommodated and communicating with the inlet; a second chamber provided inside the cabinet and forming a space separated from the first chamber; a supply unit, provided inside the second chamber, for supplying at least any one of air and moisture to the first chamber; a door having a first body rotatably fixed to the cabinet to open and close the inlet, and a second body fixed to the first body to form a front side of the cabinet; a control unit for controlling the supply unit; and a voice recognition unit, provided in the door, for recognizing a voice generated by a user and (Continued)

transmitting a control command corresponding to the recognized voice to the control unit.

16 Claims, 5 Drawing Sheets

(56) References Cited

U.S. PATENT DOCUMENTS

| | | | |
|---|---|---|---|
| 2010/0180645 A1* | 7/2010 | Kim | D06F 73/02 |
| | | | 68/5 C |
| 2014/0157673 A1* | 6/2014 | Bazzinotti | D06F 31/00 |
| | | | 49/70 |
| 2017/0067201 A1* | 3/2017 | Jeon | G08C 23/04 |
| 2017/0211874 A1 | 7/2017 | Kim et al. | |
| 2017/0350066 A1 | 12/2017 | Kim | |
| 2018/0189027 A1* | 7/2018 | Jeon | F25D 23/028 |
| 2019/0214009 A1* | 7/2019 | An | H04L 12/282 |

FOREIGN PATENT DOCUMENTS

| | | |
|---|---|---|
| EP | 3508648 | 7/2019 |
| JP | 2017133818 | 8/2017 |
| KR | 1020140072585 | 6/2014 |
| KR | 20160045545 | 4/2016 |
| KR | 1020160068938 | 6/2016 |
| KR | 1020170084454 | 7/2017 |
| KR | 1020170137505 | 12/2017 |
| KR | 1020180001024 | 1/2018 |
| WO | WO02068886 | 9/2002 |

OTHER PUBLICATIONS

Office Action in Chinese Appln. No. 201980056692.2, mailed on Mar. 30, 2023, 20 pages (with English translation).

Office Action in Chinese Appln. No. 201980056692.2, dated Jul. 22, 2022, 17 pages (with English translation).

Extended European Search Report in European Appln. No. 19854645.9, dated May 10, 2022, 9 pages.

* cited by examiner

CLOTHING PROCESSING APPARATUS

CROSS-REFERENCE TO RELATED APPLICATIONS

This application is a National Stage application under 35 U.S.C. § 371 of International Application No. PCT/KR2019/010754, filed on Aug. 23, 2019, which claims the benefit of U.S. Provisional Application No. 62/722,990, filed on Aug. 27, 2018. The disclosures of the prior applications are incorporated by reference in their entirety.

TECHNICAL FIELD

The present disclosure relates to a laundry treating apparatus.

BACKGROUND

A laundry treating apparatus collectively refers to a laundry washing apparatus, a laundry drying apparatus, an apparatus capable of selectively executing a laundry washing function and a laundry drying function, and a laundry refreshing apparatus.

The laundry washing apparatus is an apparatus for removing contaminant from laundry by rotating a drum, in which laundry is stored, inside a tub in which water is stored (by rubbing laundry with water). The laundry drying apparatus is an apparatus for removing water from the laundry by supplying the heated air to the drum in which the laundry is stored. The laundry refreshing apparatus is an apparatus for removing odors and wrinkles from laundry by supplying at least one of water (steam, mist, etc.) and hot air to the laundry.

The laundry treating apparatus of the related art comprises control panels configured to input a control command from a user and provide the user with information related to an operation of the laundry treating apparatus. It is general that the control panels provided in the laundry treating apparatuses of the related art have an input module in the form of button or knob or an input module in the form of touch screen.

Since the aforementioned type input module of the related art has limitation in controlling the laundry treating apparatus at a position spaced apart from the laundry treating apparatus because a user can manipulate the laundry treating apparatus only if the user should move to a distance to be in contact with the input module.

SUMMARY

An object of the present disclosure is to provide a laundry treating apparatus that recognizes a user's voice as a control command.

Another object of the present disclosure is to provide a laundry treating apparatus that recognizes a user's voice and is operated in accordance with a control command corresponding to the recognized voice.

A laundry treating apparatus of the present disclosure comprises a first chamber providing a space in which laundry is accommodated, and including an inlet; a supply module supplying at least one of the air and water to the first chamber; a door opening or closing the inlet; a controller controlling the supply module; and a voice recognition module provided in the door, recognizing a voice generated by a user and transmitting a control command corresponding to the recognized voice to the controller.

The voice recognition module may include a seating body fixed to the door, forming any one of an upper surface of the door, a left side of the door, a right side of the door and a lower surface of the door; a chamber forming module forming an accommodating chamber protruded from the seating body; a microphone fixed to the seating body and positioned inside the accommodating chamber; and a communication hole communicated with the accommodating chamber by passing through the chamber forming module.

A laundry treating apparatus of the present disclosure comprises a cabinet provided with an inlet; a first chamber provided inside the cabinet to provide a space in which laundry is accommodated; and communicated with the inlet; a second chamber provided in the cabinet, forming a space partitioned from the first chamber; a supply module provided inside the second chamber, supplying at least one of the air and water to the first chamber; a door having a first body rotatably fixed to the cabinet to open or close the inlet and a second body fixed to the first body to form a front surface of the cabinet; a controller controlling the supply module; and a voice recognition module provided in the door, recognizing a voice generated by a user and transmitting a control command corresponding to the recognized voice to the controller.

The voice recognition module may include a seating body fixed to the door, forming any one of an upper surface of the door, a left side of the door, a right side of the door and a lower surface of the door; a chamber forming module forming an accommodating chamber protruded from the seating body; a microphone fixed to the seating body and positioned inside the accommodating chamber; and a communication hole communicated with the accommodating chamber by passing through the chamber forming module.

The laundry treating apparatus of the present disclosure may further comprise a first seating groove providing a space, into which the seating body is inserted, as an upper surface of the first body is bent to be concave, wherein the accommodating chamber and the communication hole may be positioned outside the first seating groove.

The communication hole may be provided with two or more holes passing through the chamber forming module.

The voice recognition module may further include an analyzer fixed to the first body, converting a voice transmitted from the microphone into text or code and transmitting the converted text or code to the controller.

The laundry treating apparatus of the present disclosure may further comprise a tape provided along an edge of a surface headed for the second body in a space provided by the first body, fixing the second body to the first body; a tape through hole communicating a space formed between the first body and the second body with the outside of the door by passing through the tape; and a sound generator provided in the space formed between the first body and the second body, generating a sound signal.

The sound generator may be provided to generate a sound signal indicating the time when the microphone starts recording.

The sound generator may be provided to generate a sound signal indicating that voice recognition has been failed when the analyzer fails to convert a user's voice into text or code.

The sound generator may be provided to generate a sound signal indicating that voice recognition has been completed when the analyzer completely converts a user's voice into text or code.

The tape may include a first tape provided along a left edge of the surface headed for the second body in the space provided by the first body, and a second tape provided along a right edge of the surface headed for the second body in the space provided by the first body, the tape through hole may include a first tape through hole provided to pass through the first tape and a second tape through hole provided to pass through the second tape, and the sound generator may be positioned between the first tape through hole and the second tape through hole.

The laundry treating apparatus of the present disclosure may further comprise a second seating groove provided as a groove formed as the first body is bent to be concave in a direction far away from the second body, and configured to allow the sound generator to be fixed thereto.

The laundry treating apparatus of the present disclosure may further comprise a control panel provided with a display module on which a control command is displayed and an input module to which a control command is input from a user; a third seating groove provided as a groove formed as the first body is bent to be concave in a direction far away from the second body, providing a space in which the control panel is accommodated; and a transparent area provided in the second body, exposing the control panel to the outside of the door.

The laundry treating apparatus of the present disclosure may further comprise an alarm module generating a sound signal when the control command is input through the input module or when an error occurs while the selected control command is being executed, wherein the alarm module may be positioned between the first tape through hole and the second tape through hole.

The present disclosure provides a laundry treating apparatus that recognizes a user's voice as a control command.

Also, the present disclosure provides a laundry treating apparatus that recognizes a user's voice and is operated in accordance with a control command corresponding to the recognized voice.

DETAILED DESCRIPTION

Hereinafter, the preferred embodiments according to the present disclosure will be described with reference to the accompanying drawings. A configuration of an apparatus or a control method thereof, which will be described below, is intended to describe the embodiment of the present disclosure but is not intended to limit the scope of the present disclosure. Wherever possible, the same reference numbers will be used throughout the drawings to refer to the same or like parts.

Figure 1:
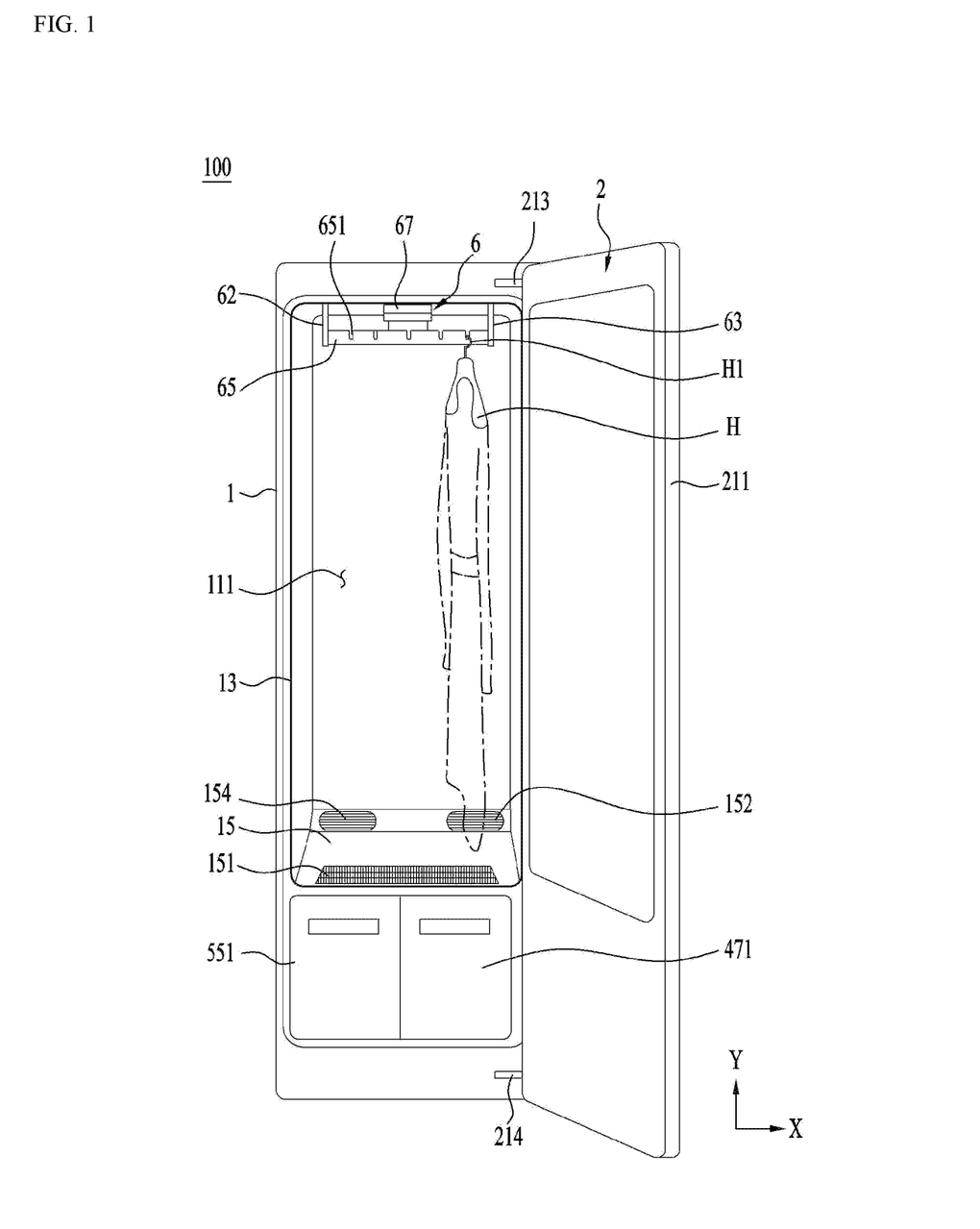
FIGS. 1, 2 and 3 illustrate an example of a laundry treating apparatus of the present disclosure.
Figure 2:
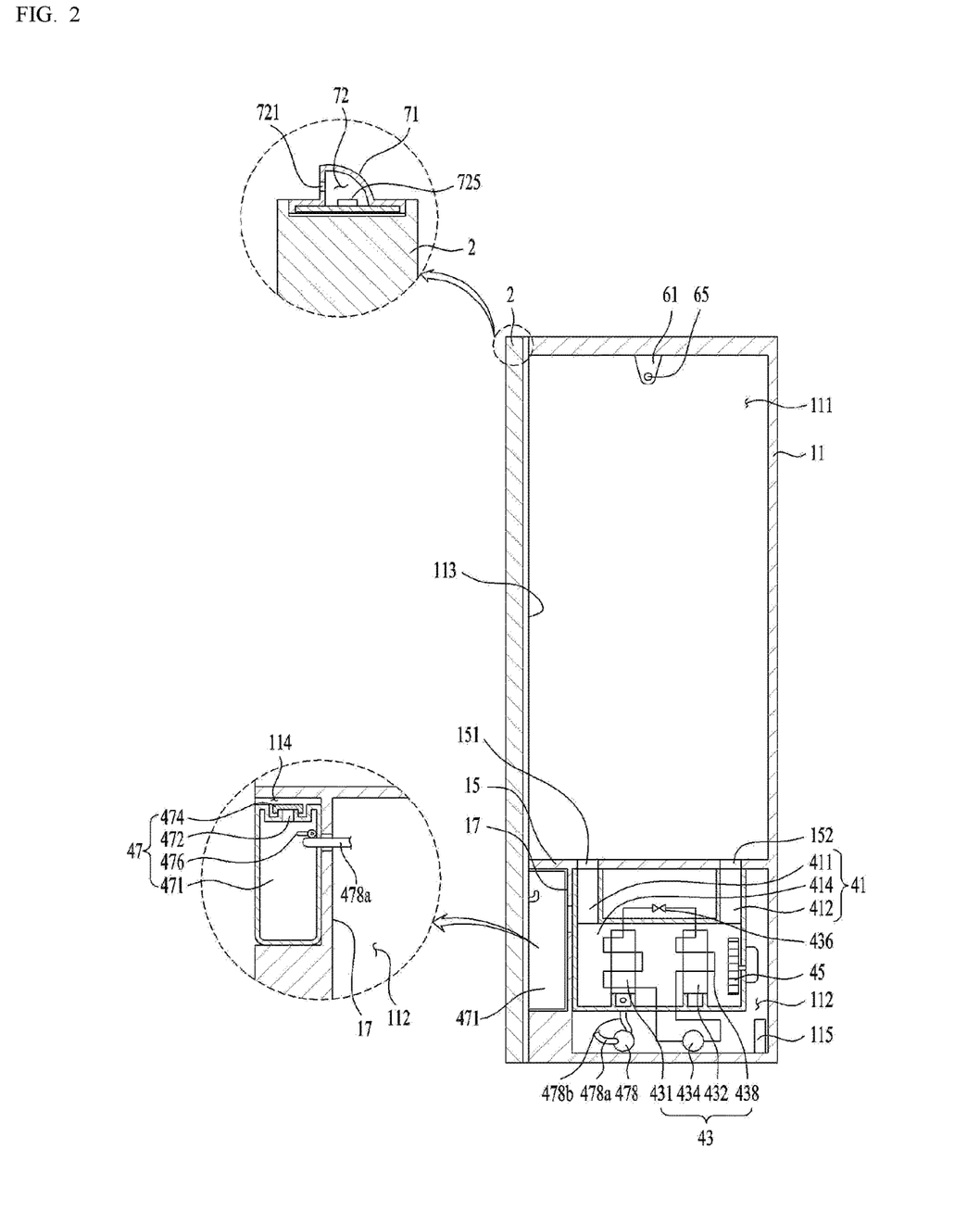
Figure 3:
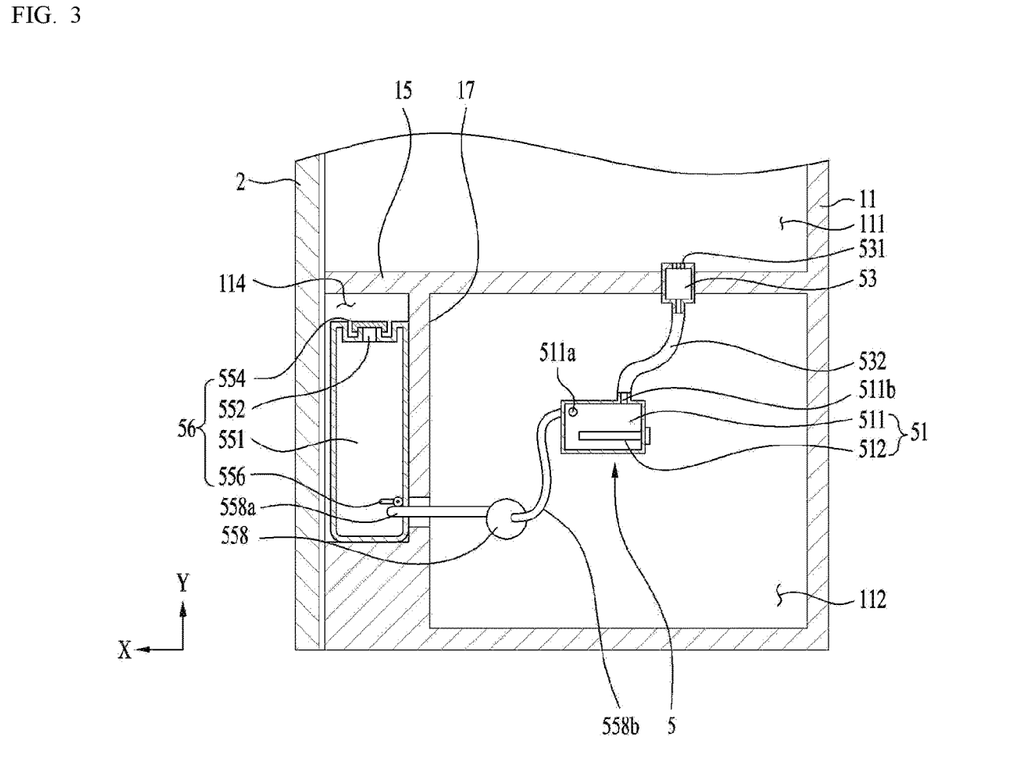

As shown in FIG. 1, a laundry treating apparatus 100 of the present disclosure comprises a cabinet 1 forming an external appearance, and a first chamber 111 provided inside the cabinet, providing a space in which laundry is accommodated. As shown in FIG. 2, a second chamber 112 forming a space spaced apart from the first chamber, positioned below the first chamber is provided inside the cabinet. Supply modules 4 and 5 for supplying at least one of water and the air to the first chamber 111 is provided inside the second chamber 112. FIGS. 2 and 3 illustrate that the supply modules 4 and 5 are provided as an air supply module 4 for supplying the air to the first chamber 111 and a water supply module 5 for supplying water to the first chamber, as an example.

As shown in FIG. 2, the cabinet 1 may be provided to include a cabinet body 11 provided with an inlet 13 on a front surface. In this case, the first chamber 111 is fixed to the cabinet body 11 and communicated with the inlet 13, and the first chamber 111 and the second chamber 112 may be partitioned from each other by a first partition 15 for partitioning an inner space of the cabinet body 11 into an upper space and a lower space.

The cabinet body 11 may be provided with a tank seating portion 114 positioned below the first chamber 111 and in front of the second chamber 112. The tank seating portion 114 may be partitioned from the first chamber 111 by the first partition 15, and may be provided to form a space partitioned from the second chamber 112 through a second partition 17.

The first partition 15 is provided with a first communication hole 151 and a second communication hole 152, which communicate the first chamber 111 with the second chamber 112.

The air supply module 4 may be provided to include a circulating duct 41 provided in the second chamber 112, a heat exchanger 43 for executing dehumidification and heating of the air entering the circulating duct, and a water collecting module 47 for discharging condensed water generated from the heat exchanger 43 to the outside of the second chamber 112.

The circulating duct may be provided to include an intake duct 411 connected to the first communication hole 151, an exhaust duct 412 connected to the second communication hole 152, and a connection duct 414 connecting the intake duct with the exhaust duct.

The circulating duct is provided with a fan 45 for allowing the air of the first chamber 111 to move to the intake duct, the connection duct and the exhaust duct in due order, and FIG. 2 illustrates that the fan 45 is provided in the connection duct 414 as an example.

The heat exchanger 43 may be provided in any device as far as it may dehumidify the air entering the intake duct 411 and heat the dehumidified air, and FIG. 2 illustrates that the heat exchanger 43 is provided as a heat pump as an example.

That is, the heat exchanger 43 of FIG. 2 may be provided to include a refrigerant pipe 438 forming a circulating path of a refrigerant, a first heat exchanger 431 fixed to the refrigerant pipe and positioned inside the connection duct 414, a second heat exchanger 432 fixed to the refrigerant pipe and positioned between the first heat exchanger 431 and the fan 45, a compressor 434 circulating the refrigerant between the two heat exchangers 431 and 432 along the refrigerant pipe, and a pressure controller 436 for controlling a pressure of the refrigerant pipe. The compressor 434 and the pressure controller 436 may be positioned outside the circulating duct 41.

The first heat exchanger 431 may be provided as an evaporator for cooling the air by transferring heat of the air entering the intake duct 411 to the refrigerant, and evaporating the refrigerant. In this case, water contained in the air will be collected in a bottom surface of the connection duct 414 by moving along a surface of the first heat exchanger 431.

The second heat exchanger 432 may be provided as a condenser for heating the air and condensing the refrigerant by transferring heat of the refrigerant passing through the compressor 434 to the air passing through the first heat exchanger.

The water collecting module 47 may be provided to include a water collecting tank 471 provided in the tank seating portion 114, providing a space in which water is stored, a water collecting tank through hole provided to pass through the water collecting tank 471, a first discharge pipe 478a inserted into the water collecting tank through hole, a second discharge pipe 478b discharging the condensed water discharged from the first heat exchanger 431 to the outside of the circulating duct, and a discharge pump 478 moving the condensed water discharged to the second discharge pipe 478b to the first discharge pipe 478a.

The water collecting tank 471 may detachably be provided in the tank seating portion 114. In this case, a check valve 476 may be provided in the water collecting tank through hole. The check valve 476 is provided to allow the first discharge pipe 478a to be inserted into the water collecting tank through hole and prevent the water inside the water collecting tank from being discharged through the water collecting tank through hole. Therefore, if the water collecting tank 471 is fixed to the tank seating portion 114, a controller 115 may move the condensed water inside the circulating duct to the water collecting tank 471 through the discharge pump 478.

A drainage hole 472 for discharging the condensed water stored in the water collecting tank 471 is provided on one surface of the water collecting tank 471, and FIG. 2 illustrates that the drainage hole 472 is provided on an upper surface of the water collecting tank as an example. The drainage hole 472 may be opened or closed by a cover 474 detachably provided in the water collecting tank.

The water supply module 5 provided in the present disclosure may be provided to supply heated steam to the first chamber, or may be provided to supply steam (mist, etc.), which is not heated, to the first chamber. FIG. 3 illustrates that the water supply module 5 is provided to supply steam generated by heating water to the first chamber as an example.

That is, the water supply module 5 may be provided with a steam generator 51 provided in the second chamber 112, generating steam, a spray module 53 discharging steam generated from the steam generator to the first chamber 111, and a water supply module 55 supplying water to the steam generator.

The steam generator 51 may include a storage module 511 provided inside the second chamber 112, providing a space in which water is stored, and a heater 512 provided to heat water inside the storage module 511. The storage module 511 is provided with a water supply hole 511a through which water enters, and a steam discharge hole 511b discharging steam inside the storage module 511.

The spray module 53 may be provided as a spray body fixed to a third communication hole 154 (see FIG. 1) provided to pass through the first partition 15. In this case, the spray body may be connected to the steam discharge hole 511b through a connection pipe 532, and the steam inside the spray body may move to the first chamber 111 through a spray hole 531 passing through an upper surface of the spray body.

The water supply module 55 may be provided to include a supply tank 551 provided in the tank seating portion 114, and a supply pump 558 supplying water stored in the supply tank 551 to the storage module 511.

The supply tank 551 may detachably be provided in the tank seating portion 114. In this case, the supply tank 551 is provided with a supply tank through hole provided to pass through the supply tank and a check valve 556 opening or closing the supply tank through hole, and the water supply module 55 may be provided to include a first supply pipe 558a inserted into the supply tank through hole by passing through the second partition 17, and a second supply pipe 558b connected to the water supply hole 511a. In this case, the water entering the first supply pipe 558a will be moved to the second supply pipe 558b through the supply pump 558.

The check valve 556 is provided to open the supply tank through hole only if the first supply pipe 558a is inserted into the supply tank through hole. Therefore, if the supply tank 551 is fixed to the tank seating portion 114, the controller 115 will supply water to the storage module 511 through the supply pump 558.

A water supply hole 552 is provided on one surface of the supply tank 551, and FIG. 3 illustrates that the water supply hole 552 is provided on the upper surface of the supply tank as an example. The water supply hole 552 may be opened or closed by a cover 554 detachably provided in the supply tank.

The controller 115 provided to control the air supply module 4 and the water supply module 5 may be provided in the second chamber 112.

As shown in FIG. 1, the laundry treating apparatus 100 of the present disclosure is provided with a support module 6 for fixing laundry into the first chamber 111 in a state that the laundry is unfolded. The support module 6 may be provided to include a support bar 65 for detachably supporting a hook H1 of a hanger H, and first and second connection modules 61 and 63 for fixing both ends of the support bar 65 to the cabinet body 11.

The first connection module 61 may be provided to connect the upper surface of the first chamber 111 with one end of the support bar 65, and the second connection module 63 may be provided to connect the upper surface of the first chamber 111 with the other end of the support bar 65. The support bar 65 may be provided with a hanger groove 651 in which the hanger hook H1 is accommodated.

The support module 6 may further include a driving module 67 for allowing the support bar 67 to move along a width direction (X-axis direction) of the first chamber 111.

The inlet 13 and the tank seating portion 114 may be provided to be opened or closed by a door 2. That is, the door 2 is provided in a shape capable of closing both the inlet 13 and the tank seating portion 114, and may rotatably be fixed to the cabinet body 11 through a first hinge 213 and a second hinge 214.

Figure 4:
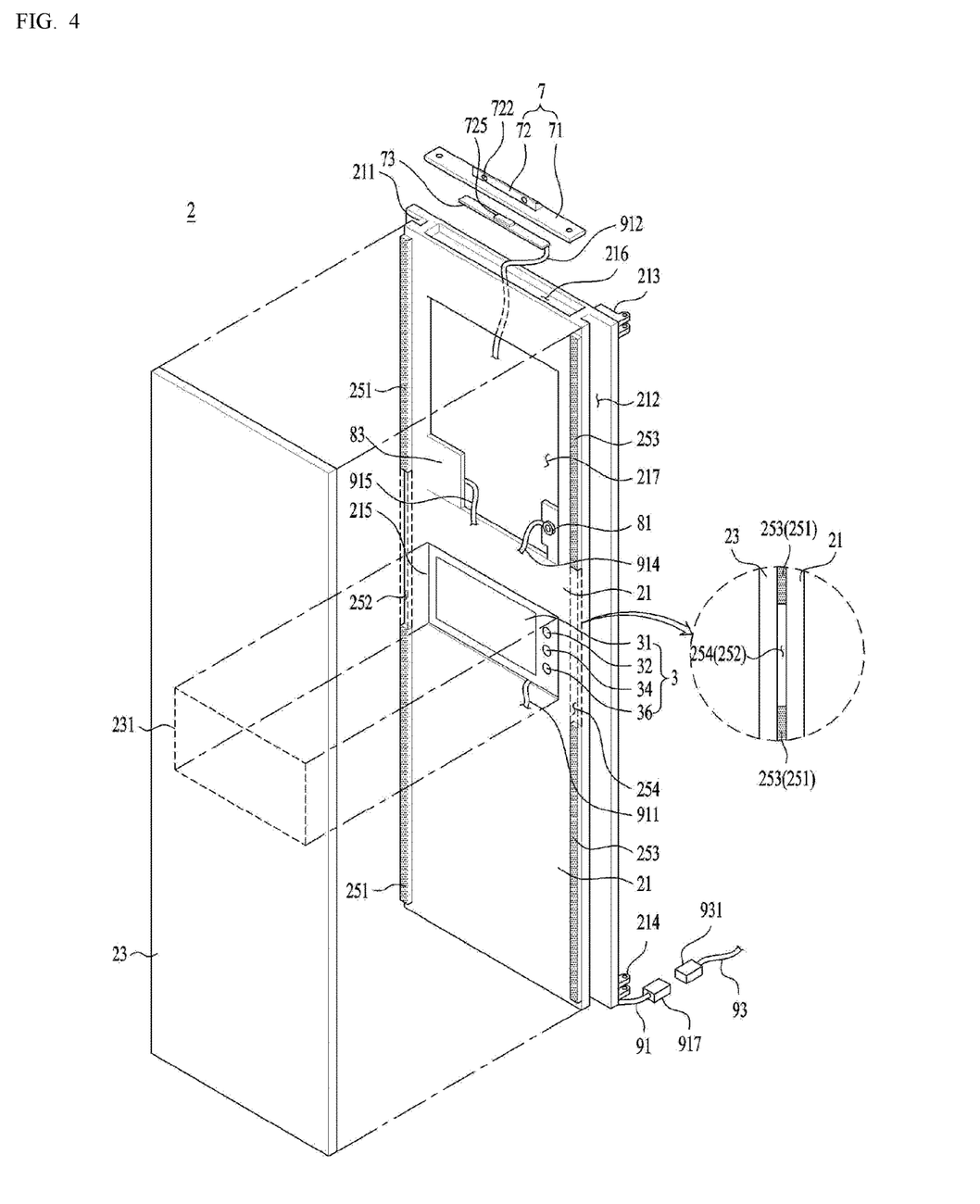
FIG. 4 illustrates an example of a door provided in the present disclosure.

As shown in FIG. 4, the door 2 may include a first body 21 fixed to the cabinet body 11 through the first hinge 213 and the second hinge 214, and a second body 23 fixed to the first body 21, forming a front surface of the cabinet 1.

A first groove 211 and a second groove 212 are provided at both sides of the first body 21. The first groove 211 may be formed as a left side of the first body 21 is bent to be concave, and the second groove 212 may be formed as a right side of the first body 21 is bent to be concave.

If the first hinge 213 and the second hinge 214 are provided at a right side of the first door 21 (case of FIG. 4), a user may use the first groove 211 as a handle. Unlike this case, if the first hinge 213 and the second hinge 214 are provided at a left side of the first door 21, the user may use the second groove 212 as a handle.

The first body 21 is provided with a control panel seating groove (third seating groove) to which the control panel 3 is fixed. The third seating groove 215 may be provided as a groove formed as a surface of the first body 21 is bent to be concave.

The control panel 3 may be provided with a display module 31 on which a control command is displayed, and input modules 32, 34 and 36 to which the control command is input from a user. The input modules may be provided to include a first input module 32 to which a control command to supply a power to the controller 115 and the supply modules 4 and 5 is input, a second input module 34 to which a selection command of a course (treating stroke) provided in the laundry treating apparatus, and a third input module 36 to which a start command or a stop command of the selected course is input. The second body 23 may be provided with a transparent area 231 for exposing the display module 31 and the input modules 32, 34 and 36 to the outside of the door 2.

The door 2 is provided with a voice recognition module 7 for recognizing a voice generated by a user and transmitting a control command corresponding to the recognized voice to the controller 115. The voice recognition module 7 may be fixed to the door 2 and provided to form any one of an upper surface of the door, a left side of the door, a right side of the door and a lower surface of the door. FIG. 4 illustrates that the voice recognition module 7 is provided to form the upper surface of the door as an example.

Figure 5:
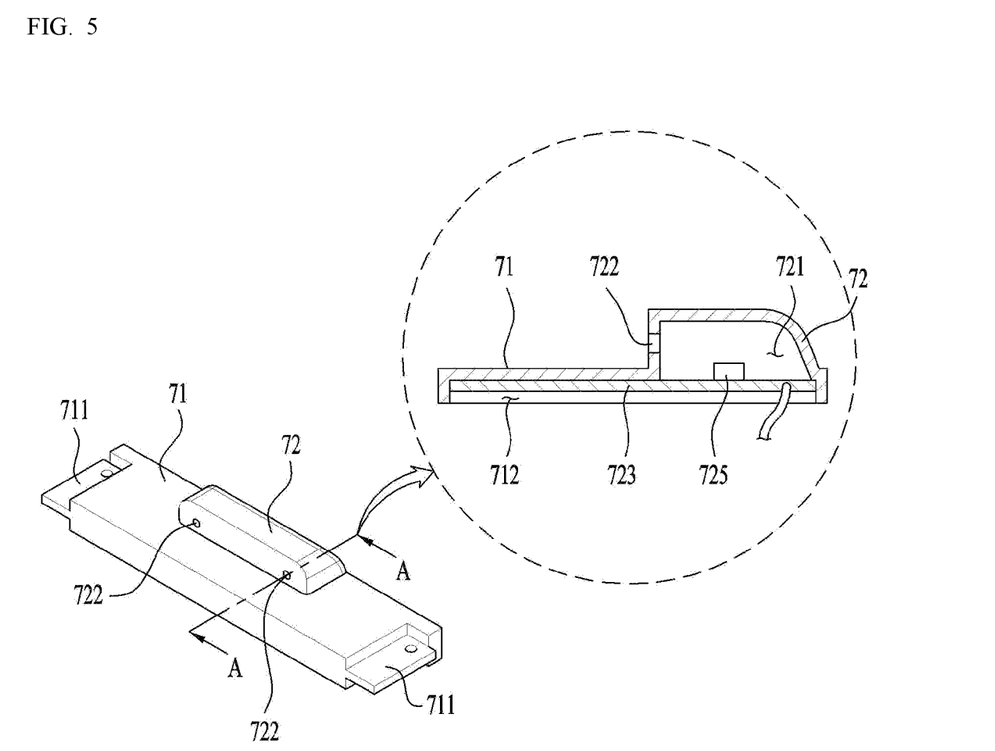
FIG. 5 illustrates an example of a voice recognition module provided in the present disclosure.

As shown in FIG. 5, the voice recognition module 7 may include a seating body 71 forming the upper surface of the door 2, a chamber forming module 72 forming an accommodating chamber 721 protruded from the seating body 71, a microphone 725 fixed to the seating body 71 and positioned inside the accommodating chamber 721 to convert a user's voice into an electrical signal, and a communication hole 722 communicated with the accommodating chamber 721 by passing through the chamber forming module 72. The communication hole 722 may be provided as two or more holes passing through the chamber forming module 72.

As shown in FIG. 4, a recognition module seating groove 216 (first seating groove) to which the seating body 71 is fixed may be provided on the upper surface of the first body 21. The first seating groove 216 may be provided as a groove formed as the upper surface of the first body 21 is bent to be concave. In this case, the accommodating chamber 721 and the communication hole 722 should be provided to be positioned outside the first seating groove 216. This is to allow a user's voice to be easily transferred to the microphone 725.

As shown in FIG. 5, a fastening rib 711 for fixing the seating body 71 to the first seating groove 216 is provide at both ends of the seating body 71. The fastening rib 711 may be provided at both ends of the seating body 71, wherein the both ends face each other, and a fastening hole through which a fastening member such as bolt passes may be provided in the fastening rib 711.

Meanwhile, a printed circuit board (PCB) accommodating groove 712 for providing a space in which a PCB 723 is seated is provided on a lower surface of the seating body 71. The PCB accommodating groove 712 may be provided as a groove formed as a lower surface of the seating body 71 is bent to be concave toward an upper surface on which the accommodating chamber 721 is positioned. The PCB accommodating groove 712 is communicated with the accommodating chamber 721 and provided to be positioned below the accommodating chamber 721. Therefore, if the PCB 723 is fixed to the PCB accommodating groove 712, the microphone 725 fixed to the PCB 723 may be positioned in the accommodating chamber 721.

The voice recognition module 7 further includes an analyzer 73 fixed to the first body 21, converting a voice transmitted from the microphone 725 into text or code and transmitting the converted text or code to the controller 115. For fixture of the analyzer 73, the first body 21 may further be provided with a second seating groove 217. The second seating groove 217 may be provided as a grove formed as the surface of the first body 21 is bent to be concave, and may be positioned above the third seating groove 215.

The laundry treating apparatus of the present disclosure may further comprise a sound generator 81 provided between the first body 21 and the second body 23, generating a sound signal. The sound generator 81 is a means for generating a sound signal indicating the time when the microphone 725 starts recording, and FIG. 4 illustrates that the sound generator 81 is provided in the second seating groove 217 as an example.

If the analyzer 73 fails to convert the user's voice into text or code, the sound generator 81 may be provided to generate a sound signal indicating that voice recognition has been failed. Moreover, the sound generator 81 may be provided to generate a sound signal indicating that voice recognition has been successfully performed when the analyzer 73 completely converts the user's voice into text or code.

The second body 23 may be fixed to the front surface of the first body 21 through tapes 251 and 253 provided along an edge of the first body 21. In this case, the tapes 251 and 253 are preferably provided to include tape through holes 252 and 254 for communicating a space formed between the first body 21 and the second body 23 with the outside of the door 2. This is to allow the sound signal generated from the sound generator 81 to be transferred to the outside of the door 2.

The tapes may be provided with first and second tapes 251 and 253 respectively provided at left and right edges of a surface headed for the second body 23 in the space provided by the first body 21. In this case, the tape through holes are provided with a first tape through hole 252 provided to pass through the first tape 251 and a second tape through hole 254 provided to pass through the second tape 253, and the sound generator 81 is preferably positioned between the first tape through hole 252 and the second tape through hole 254.

The second seating groove 217 may further be provided with an alarm module 83. The alarm module 83 is a means for generating a sound signal when a control command is input through the input modules 32, 34 and 36 or when an error occurs while the selected control command is being executed. The alarm module 83 is preferably positioned between the first tape through hole 252 and the second tape through hole 254.

The control panel 3, the voice recognition module 7, the sound generator 81 and the alarm module 83 are connected to the controller 115 through wires 91 and 93. The wires are provide with a door wire 91 provided in the door 2, and a controller wire 93 connected to the controller 115. A first fastening module 917 is provided at a free end of the door wire 91, and a second fastening module 931 detachably coupled to the first fastening module 917 is provided at a free end of the controller wire 93.

The door wire 91 is comprised of a panel wire 911 provided in the control panel 3, a recognition module wire 912 provided in the PCB 723, a generator wire 914 provided in the sound generator 81, and an alarm wire 915 provided in the alarm module 83.

In order to prevent the wires 91 and 93 as well as the second seating groove 217 from being exposed to the outside of the door 2 through the second body 23, an area except the transparent area 231 in the second body 23 is preferably provided as an opaque area.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A laundry treating apparatus comprising:
a cabinet that defines an inlet;
a first chamber provided inside the cabinet and configured to accommodate laundry, the first chamber being fluidly connected to the inlet;
a second chamber provided in the cabinet, the second chamber being partitioned from the first chamber;
a supply module provided inside the second chamber and configured to supply at least one of air or water to the first chamber;
a door having that is rotatably coupled to the cabinet and configured to open and close the inlet;
a controller configured to control the supply module; and
a voice recognition module disposed on the door, the voice recognition module being configured to recognize a voice generated by a user and to transmit a control command corresponding to the recognized voice to the controller,
wherein the voice recognition module includes:
a chamber forming module that protrudes from and is installed on any one of an upper surface, a side surface, or a lower surface of the door, the chamber forming module protruding to an outside of the door and being exposed to a front of the door,
a microphone disposed inside the chamber forming module and disposed on the any one of the upper surface, the side surface, or the lower surface of the door, and
a communication hole defined at a front surface of the chamber forming module.

2. The laundry treating apparatus of claim 1, wherein the voice recognition module further comprises:
a seating body fixed to the door, the seating body defining the any one of the upper surface, the side surface, or the lower surface of the door;
wherein the chamber forming module defines an accommodating chamber protruded from the seating body,
wherein the microphone is fixed to the seating body and positioned inside the accommodating chamber.

3. The laundry treating apparatus of claim 2, wherein the upper surface of the door is concave and defines a first seating groove receiving the seating body, and
wherein the accommodating chamber and the communication hole are positioned outside the first seating groove.

4. The laundry treating apparatus of claim 3, wherein the communication hole includes two or more holes.

5. The laundry treating apparatus of claim 3, wherein the voice recognition module further includes an analyzer fixed to the door, the analyzer being configured to convert a voice transmitted from the microphone into text or code and to transmit the converted text or code to the controller.

6. The laundry treating apparatus of claim 5, wherein the door comprises (i) a first body that is rotatably coupled to the cabinet and configured to open and close the inlet and (ii) a second body that is coupled to the first body and defines a front surface of the cabinet, and
wherein the laundry treating apparatus further comprises:
a tape provided along an edge of a first surface of the first body facing the second body, the tape being disposed in a space provided by the first body and fixing the second body to the first body;
a tape through hole fluidly connecting a space between the first body and the second body with the outside of the door by passing through the tape; and
a sound generator provided in the space between the first body and the second body, the sound generator being configured to generate one or more sound signals.

7. The laundry treating apparatus of claim 6, wherein the sound generator is configured to generate a sound signal indicating a time when the microphone starts recording.

8. The laundry treating apparatus of claim 6, wherein the sound generator is configured to generate a sound signal indicating that voice recognition has been failed when the analyzer fails to convert the voice of the user into text or code.

9. The laundry treating apparatus of claim 6, wherein the tape includes:
a first tape provided along a left edge of the first surface facing the second body, the first tape being disposed in the space provided by the first body; and
a second tape provided along a right edge of the first surface facing the second body, the second tape being disposed in the space provided by the first body,
wherein the tape through hole includes:
a first tape through hole that passes through the first tape, and
a second tape through hole that passes through the second tape, and
wherein the sound generator is positioned between the first tape through hole and the second tape through hole.

10. The laundry treating apparatus of claim 9, wherein the first body further defines a second seating groove that is concave in a direction far away from the second body, and
wherein the sound generator is fixed in the second seating groove.

11. The laundry treating apparatus of claim 9, further comprising:
a control panel comprising (i) a display module configured to display one or more control commands and (ii) an input module configured to receive input of a control command among the one or more control commands from the user,
wherein the first body further defines a third seating groove that is concave in a direction far away from the second body and accommodates the control panel, and
wherein the second body comprises a transparent area that exposes the control panel to the outside of the door.

12. The laundry treating apparatus of claim 11, further comprising an alarm module configured to generate a sound signal based on the control command being input through the input module or based on an error occurring while the control command is executed,
wherein the alarm module is positioned between the first tape through hole and the second tape through hole.

13. The laundry treating apparatus of claim 6, wherein the first body and the second body are spaced apart from each other in a front-rear direction, and wherein the laundry treating apparatus further comprises a tape that attaches the first body and the second body to each other.

14. The laundry treating apparatus of claim 2, wherein the communication hole passes through a front surface of the chamber forming module.

15. The laundry treating apparatus of claim 2, wherein the communication hole is positioned outside a perimeter of the door.

16. The laundry treating apparatus of claim 1, wherein the voice recognition module is disposed on the upper surface of the first bodydoor.

\* \* \* \* \*